United States Patent [19]
Ackley et al.

[11] Patent Number: 6,027,548
[45] Date of Patent: Feb. 22, 2000

[54] PSA APPARATUS AND PROCESS USING ADSORBENT MIXTURES

[75] Inventors: Mark William Ackley, East Aurora; Alan Barnard Stewart, Snyder; Gregory William Henzler, East Amherst; Frederick Wells Leavitt; Frank Notaro, both of Amherst; Michael Scott Kane, Getzville, all of N.Y.

[73] Assignee: Praxair Technology, Inc., Danbury, Conn.

[21] Appl. No.: 09/097,172

[22] Filed: Jun. 12, 1998

Related U.S. Application Data

[63] Continuation-in-part of application No. 08/766,443, Dec. 12, 1996, Pat. No. 5,769,928.

[51] Int. Cl.$^7$ .................................................. B01D 53/047
[52] U.S. Cl. .................................. 95/96; 95/117; 95/130; 95/139; 95/143; 95/145; 96/130; 96/132; 96/144; 96/154
[58] Field of Search ................ 95/96–106, 117–126, 95/145, 130, 139, 143; 96/108, 121–123, 130–133, 143, 144, 154

[56] References Cited

U.S. PATENT DOCUMENTS

| | | | |
|---|---|---|---|
| 3,025,233 | 3/1962 | Figert | 210/502 |
| 3,287,884 | 11/1966 | Scofield | 95/145 |
| 3,899,310 | 8/1975 | Chi et al. | 55/71 |
| 4,153,429 | 5/1979 | Matthews et al. | 95/117 |
| 4,194,892 | 3/1980 | Jones et al. | 55/58 |
| 4,283,204 | 8/1981 | Savage | 55/3 |
| 4,499,208 | 2/1985 | Fuderer | 502/415 |
| 4,544,384 | 10/1985 | Metschl et al. | 96/130 |
| 4,572,178 | 2/1986 | Takase et al. | 96/132 X |
| 4,636,225 | 1/1987 | Klein et al. | 96/132 X |
| 4,711,645 | 12/1987 | Kumar | 95/122 X |
| 4,762,537 | 8/1988 | Fleming et al. | 55/71 |
| 5,169,413 | 12/1992 | Leavitt | 96/130 X |
| 5,173,462 | 12/1992 | Plee | 502/67 |
| 5,203,887 | 4/1993 | Touissant | 55/25 |
| 5,232,474 | 8/1993 | Jain | 95/97 |
| 5,258,060 | 11/1993 | Gaffney et al. | 95/101 |
| 5,324,159 | 6/1994 | Nowobilski et al. | 414/301 |
| 5,447,558 | 9/1995 | Acharya | 96/132 X |
| 5,451,248 | 9/1995 | Sadkowski et al. | 95/105 X |
| 5,520,721 | 5/1996 | Fraysse et al. | 96/132 X |
| 5,529,610 | 6/1996 | Watson et al. | 96/130 X |

(List continued on next page.)

FOREIGN PATENT DOCUMENTS

| | | | |
|---|---|---|---|
| 0325392A2 | 7/1989 | European Pat. Off. | |
| 4443191A1 | 6/1996 | Germany. | |
| 52-031559 | 3/1977 | Japan | 96/122 |
| 55-158107 | 12/1980 | Japan | 96/132 |
| 62-148304 | 7/1987 | Japan | 96/132 |
| 1069160 | 1/1984 | U.S.S.R. | 95/119 |
| 2189167 | 10/1987 | United Kingdom | 96/131 |

OTHER PUBLICATIONS

Ralph T. Yang, "Gas Separation by Adsorption Processes", *Butterwoth's Series in Chemical Engineering* (no date).

E. Alpay et al, "Combined Reaction and Separation in Pressure Swing Adsorption", *Chemical Engineering Science*, vol. 49, No. 24B, pp. 5845–5864, 1994.

*Primary Examiner*—Robert H. Spitzer
*Attorney, Agent, or Firm*—Robert J. Follett

[57] ABSTRACT

The invention comprises a PSA apparatus for the separation of a heavy component from a light component in a feed stream. The apparatus includes an adsorbent bed comprising either a mixture of adsorbents or composite adsorbent particles wherein each particle comprises two or more adsorbents. At least one of the adsorbents is comparatively weak and the other is comparatively strong. Another embodiment of the invention is a PSA prepurifier having a bed of adsorbent material which comprises a mixture of, or composite adsorbent particles wherein each particle comprises at least two adsorbents, at least one of the adsorbents being comparatively strong and at least another of the adsorbents being comparatively weak.

31 Claims, 9 Drawing Sheets

U.S. PATENT DOCUMENTS

| | | | |
|---|---|---|---|
| 5,536,301 | 7/1996 | Lansbarkis et al. | 95/126 X |
| 5,560,763 | 10/1996 | Kumar | 95/98 |
| 5,593,475 | 1/1997 | Minh | 96/132 X |
| 5,620,504 | 4/1997 | Coates | 96/133 X |
| 5,624,477 | 4/1997 | Armond | 96/132 X |
| 5,656,065 | 8/1997 | Kalbassi et al. | 95/96 |
| 5,674,311 | 10/1997 | Notaro et al. | 96/132 X |
| 5,769,928 | 8/1998 | Leavitt | 95/95 |
| 5,779,767 | 7/1998 | Golden et al. | 96/143 X |

PSA APPARATUS AND PROCESS USING ADSORBENT MIXTURES

This is a Continuation-in-Part of prior U.S. Application(s) Ser. No. 08/766,443 Filing Date: Dec. 12, 1996, now U.S. Pat. No. 5,769,928.

FIELD OF THE INVENTION

This invention relates generally to pressure swing adsorption (PSA) (including VSA and VPSA) bulk gas separation and purification processes and systems. In particular it relates to the use of mixtures of adsorbents and composite adsorbent materials. Embodiments of layered, mixtures or composite adsorbent beds for PSA air prepurification are also disclosed.

BACKGROUND

Relatively pure oxygen (i.e. an oxygen-containing gas having an oxygen content of 88% or more) has a number of desirable industrial and medicinal applications at various pressures and purities. The Earth's atmosphere, typically comprising nearly twenty one percent oxygen gas, is the natural candidate for use as an economical oxygen source. As a result, many of the most practical and economical oxygen production plants employ air separation systems and methods.

One of the more common systems for producing oxygen in relatively large volumes incorporates cryogenic technology to liquefy and separate a desired oxygen component of a predetermined purity from the air mixture. While the design works well for high-volume oxygen production, the specialized cryogenic hardware and associated high capital startup expenditures make such systems cost-prohibitive when used for production in low to moderate volumes e.g. from about 30 to about 200 tons per day of an oxygen containing gas with an oxygen concentration higher than about 88% and up to about 95%.

Traditionally, higher volumes of oxygen have been produced via the well-known cryogenic rectification of air in which air is cooled to temperature near the normal boiling point of the components and treated in fractionation columns. The significant capital and operating costs of the cryogenic separation systems are justified only when large quantities and/or extremely high purities (such as 97%–99.999%) are required.

As an alternative to cryogenic processes, those skilled in the art have developed an air separation system that utilizes a molecular sieve adsorbent to efficiently produce oxygen at purities typically ranging from approximately 88 to 93% and up to about 95%. Used in PSA and VPSA systems, the adsorbent more selectively adsorbs $N_2$ due to the greater quadropole moment of $N_2$ compared to $O_2$ to effect component separation.

Adiabatic pressure swing processes are usually accompanied by a thermal cycling ox adverse thermal swing, i.e. the adsorption step occurs at a higher temperature than the desorption step. This thermal swing tends to increase with increasing adsorbate/adsorbent heat of adsorption and may increase with the ratio of adsorption to desorption pressure. In addition, thermal gradients develop within the bed. These gradients and swings in bed temperature result in various parts of the adsorbent bed functioning at different temperatures. The net effect of these gradients and swings in temperature is an overall lower process performance. Adsorbent properties that vary strongly with temperature are also likely to result in process instability when operating conditions change, e.g. normal ambient temperature fluctuations.

The adsorbent is often the key to the effectiveness of the process. Much attention has been given to the development, improvement and manufacture of adsorbents, e.g. specialized zeolite adsorbents have been synthesized through ion exchange, lower Si/Al structures and improved activation procedures. These additional and/or improved manufacturing steps have resulted in higher costs for these specialized adsorbents compared to standard adsorbents, e.g. LiX compared to 5A and 13X adsorbents in air separation. In many processes the adsorbent has become a significant fraction of the overall capital investment. Thus, there is considerable incentive to reduce the cost of the adsorbent if such reduction can be transformed into an overall reduction in the cost of the desired product of the separation.

The prior art has attempted to address the problem of thermal cycling in PSA processes, in some instances by employing mixtures of materials. Mixtures have also been applied independent of thermal cycling effects to improve specific elements of adsorption process performance such as product purity or recovery or storage capacity. Distinct materials have been combined physically (co-mixture) in an adsorber or have been integrally bound in a single composite bead or pellet.

Mixtures of adsorbents have also been utilized when multiple separations are required. An example is provided by Jones et al. (U.S. Pat. No. 4,194,892) for the purification of steam reformer hydrogen involving the removal of carbon dioxide, methane and carbon monoxide using a rapid pressure swing adsorption (RPSA) process. It was shown that product $H_2$ recovery was increased when a homogeneous mixture of activated carbon and crystalline molecular sieve was used in place of activated carbon alone.

Mixtures of fine and coarse particles have been applied to reduce interparticle void space, increase adsorbent density and increase gas storage capacity. Kaplan et al. (E.P. Pat. Appl. 0 325 392) provides an example of this methodology applied in PSA systems employing carbon molecular sieve (CMS) adsorbents for kinetic separation of air to produce $N_2$. In Kaplan, the main CMS adsorbent is comprised of coarse particles (2.5 to 3.0 mm) while the void space between these larger particles is filled with fine particles (40–60 mesh) of either an inert material or CMS adsorbent. The fine particle fraction is preferred to be an inert or non-adsorptive materials (e.g. glass beads) and to occupy approximately 40% by volume of the adsorber bed. The reduction in void space was shown to improve process efficiency.

Fuderer (U.S. Pat. No. 4,499,208) doped activated carbon with inert dense alumina and achieved a reduced thermal swing when adsorbing $CO_2$ at high pressure from a feed stream containing $H_2$, $CO_2$, CO and $CH_4$. Although the specific heat of the alumina is nearly the same as the activated carbon, the high density of the inert material significantly increases the heat capacity per unit volume of the bed. Lowering the thermal swing in the process significantly improved the process recovery.

Mixing high heat capacity inert additives (iron particles) with the adsorbent in the bed to increase the mean heat capacity of the bed was also suggested by Yang (*Gas Separation by Adsorption Processes*, (pp. 257, 327, 1987).

Gaffney, et. al. ( U.S. Pat. No. 5,258,060) used additional binder or an inert diluent to reduce the specific nitrogen capacity of an adsorption zone containing LiX. The inert diluent is preferably of lower heat capacity than the adsorbent and is distributed homogeneously in the bed, either in a composite particle (having increased binder) or as separate particles. The inert diluents comprise from 5% to 80% of the adsorbent bed. This dilution reduces the thermal swing and results in an increase in $N_2$ capacity and $O_2$ product recovery.

A mixture of adsorbent and catalyst particles is contemplated in processes combining reaction and separation in a pressure swing reactor (PSR) (Alpay et al., Chem. Eng. Sci. 49, 5845–5864). This disclosure considered mixtures of various adsorbents with a Pt—$Al_2O_3$ catalyst in three different industrial reaction schemes of interest. The results suggest improvements in conversion efficiency using the PSR compared to conventional steady flow reactors.

Walter in Ger. Pat. No. P4,443,191 teaches reducing thermal swing by using a single vessel, with multiple internal compartments, each containing adsorbent. The compartments are in thermal contact and arranged so that adjacent compartments are in adsorption and desorption simultaneously. Heat is transferred from the adsorbing compartments to the desorbing compartments. This resulted in increased working capacity.

Savage in U.S. Pat. No. 4,283,204 discloses the use of an adsorbent particle which contains a magnetizable component. A magnetic field is placed across the bed which stabilizes the adsorbent and prevents fluidization. No mention is made of the heat transfer effects between the adsorbent and the magnetic particles. The adsorption and desorption steps are carried out at the same pressure.

Toussaint (U.S. Pat. No. 5,203,887) suggests a reduction in the cost of adsorbent by substituting a layer of less costly NaX for the expensive LiX at the product end of a bed used in air separation processes. A second layer of NaX can also be incorporated at the feed end of the adsorber.

Gas purification, more specifically air prepurification, represents another class of adsorption separation processes where multiple adsorbents can be applied to improve process performance. The operation of cryogenic air separation plants requires large quantities of pretreated air. To prevent freezing and plugging of the primary heat exchanger, the concentration of contaminants such as $CO_2$ and $H_2O$ must be lowered to less than 1 ppm. In addition, the concentration of light hydrocarbons which have a low solubility in cryogenic liquids, such as acetylene and certain $C_3$–$C_8$ hydrocarbons, must be kept very low, typically less than 1 ppb, to prevent accumulation within the cryogenic distillation system. Currently both Thermal Swing Adsorption (TSA) and pressure swing adsorption (PSA) are used in air prepurification applications.

TSA prepurifiers use a relatively small amount of heated purge gas to regenerate the adsorption beds. The typical purge to feed ratio is $\leq 15\%$. TSA units are extremely effective at removing the major contaminants such as $CO_2$, $H_2O$ and most of the hydrocarbons from an air feed because such adsorbers usually employ strong adsorbents. Any CO and $H_2$ contained in the feed is generally carried over into the product. If it is necessary to remove the CO and $H_2$, a sequential oxidation of the CO and $H_2$ is carried out by catalytic conversion. The strong adsorbents used in TSA processes, such as 5A or 13X zeolite, require the large thermal driving forces available by TSA to affect adequate desorption. The operating adsorbate loadings and selectivities of the major contaminants on these strong adsorbents is such that $CO_2$ breaks through into the product stream before acetylene and most other hydrocarbons that are harmful to cryogenic air separation plant operation, e.g. $C_3$ through $C_8$ hydrocarbons.

The feed gas is usually chilled to minimize the water content of the feed, which in turn reduces the amount of adsorbent required. While the TSA process results in a relatively low purge-to-feed ratio, the inherent heating of the purge and chilling of the feed adds to both the capital and operating cost of the process.

PSA prepurifiers use a near-ambient temperature purge to regenerate the adsorption beds. The reduced driving force that is available from pressure swing alone requires a weaker adsorbent (e.g. alumina), shorter cycles and higher purge-to-feed ratios compared to TSA processes in order to achieve adequate desorption of $H_2O$ and $CO_2$ contaminants. Typical purge-to-feed ratios are 40%–60% in PSA prepurification.

The operating loadings of $H_2O$ and $CO_2$ on the weak adsorbents used in PSA may actually be larger than those for strong zeolites. Unfortunately, weak adsorbents such as activated alumina are unable to sufficiently retain light hydrocarbons such as acetylene in a reasonable size bed and $C_2H_2$ breaks through into the product stream ahead of $CO_2$. This leads to a potentially hazardous operating condition in a cryogenic air separation process. While the capital costs associated with a PSA prepurifier are lower than those of a TSA, the overall power requirement can be higher. In particular, blowdown or depressurization losses increase power consumption in the PSA prepurifiers, i.e. PSA units cycle much faster than TSA units, resulting in an increase in the frequency of blowdown loss steps.

In light of the above considerations, there is a need in the prepurification art for a PSA adsorbent bed that possesses the favorable desorption characteristics of activated alumina and yet has the acetylene selectivity and loading associated with the stronger zeolites. In addition, there is a need to minimize blowdown losses in order to reduce operating power. The prior art has attempted to address some of these problems.

Hitachi, in German patent application 3045451, discloses a two bed adsorbent system. The first adsorbent (13X) is used to adsorb high concentrations of both $H_2O$ and $CO_2$, thus suppressing the coadsorption of nitrogen. The second adsorbent (activated alumina) does not coadsorb nitrogen very strongly. The alumina is used to complete the $H_2O$ and $CO_2$ adsorption. By minimizing the nitrogen coadsorption in the beds, blowdown losses during depressurization are likewise minimized. Removal of light hydrocarbons was not addressed.

Kumar, in U.S. Pat. No. 4,711,645, describes a PSA prepurifier which uses activated alumina to adsorb $H_2O$ and 13X to adsorb $CO_2$. The use of activated alumina to adsorb $H_2O$ results in a lower temperature rise in the feed than if 13X were used for the whole bed. This increases the effective capacity of the 13X zone to adsorb $CO_2$. Other zeolites suggested by Kumar for the second zone are 5A, CaA, CaX and Na-mordenite. Removal of light hydrocarbons was not addressed.

Jain, in U.S. Pat. No. 5,232,474 also uses a layer of activated alumina followed by a layer of 13X. Here it is claimed that the activated alumina layer is used to adsorb all the $H_2O$ and the majority of the $CO_2$. The purpose of the downstream 13X layer is to remove hydrocarbons and residual $CO_2$ from the gas stream. Jain teaches that the 13X layer is not intended to remove large amounts of $CO_2$.

In addition to the prior art cited above that relates to bulk gas separation or air prepurification processes, the prior art also offers several different methods of deployment of material mixtures, e.g. physically mixing at least two different materials, chemically bonding at least two different materials integrally in bead, pellet or granular form, and chemically bonding in preformed structures. Examples of simple physical mixtures of individual materials have already been cited above. The bonding of different materials in a single adsorbent particle or preformed structure typically involves steps of wet mixing, curing, drying and activation. The final composite product may perform better than the average of its individual components. This performance enhancement has not always been well understood, but such improvements have often been attributed to increased surface area and/or activity resulting from the processing of the mixture. In essence, these mixtures or composites represent a new adsorbent with improved physical properties.

Frigert (U.S. Pat. No. 3,025,233) suggests integral porous cores, or structured adsorbents, for the filtration, drying and purification of refrigeration fluids. Zeolite, activated alumina and inert binder may be combined in various ratios in a porous shaped core.

Chi et al. (U.S. Pat. No. 3,899,310) combined active alumina and zeolite to form a composite adsorbent for adsorption of fatty acid compounds from refrigerant gases. The adsorption capacity of the composite was double that of a simple admixture of the same adsorbents. Chi hypothesized that the active surface area of the composite was greater than that of the adsorbent components.

Plee (U.S. Pat. No. 5,173,462) prepared a composite adsorbent containing 70%–95% zeolite with 30% to 5% clay binder, where the zeolite fraction was a mixture of >=95% low-silica CaX and <5% type A. The specific processing, activation and drying methodology applied to the composite was considered important to its performance in air separation processes.

Fleming et al. in U.S. Pat. No. 4,762,537 discloses an adsorbent bead composed of 50–95 wt. % alumina and 5–50 wt. % type Y zeolite for adsorption of HCl in the 100 ppm range. The method of producing the adsorbent results in rates and capacities for HCl which are as high as for a pure NaY bead but which have the chemical resistance to HCl of pure activated alumina. No mention is made of the heat transfer effects between the alumina and the NaY during desorption or in the adsorption step which removes HCl from the gas stream.

OBJECTS OF THE INVENTION

It is therefore an object of the invention to provide a PSA system and process that reduces the cost of adsorption processes employing high performance, high cost adsorbents. This objective is supported by improving adsorbent efficiency and/or by reducing the cost of the adsorbent. Improved adsorbent efficiency means greater adsorbent effectiveness for the desired separation.

It is a further object of the invention to provide a safe, flexible PSA prepurification process and system that ensures more efficient removal of contaminants with a lesser power requirement as compared to existing prior art systems.

SUMMARY OF THE INVENTION

The invention comprises an improved PSA system including at least one adsorbent bed comprising a mixture or mixtures of comparatively strong and weak adsorbents. In an alternative embodiment, a bed comprising a composite adsorbent of both a strong and weak adsorbent may be used. Processes for using such systems are also disclosed.

The invention also contemplates a PSA gas prepurifier for the removal of water and other contaminants present in a feed gas stream. The prepurifier of the invention has a bed of adsorbent material which is comprised of at least two adsorbents, at least one of said adsorbents being comparatively strong and at least another of said adsorbents being comparatively weak with respect to the adsorption of said water and other contaminants. The bed may be arranged wherein the two or more adsorbents are: 1) in discrete layers, 2) are mixed together, or 3) are in the form of a single composite adsorbent particle.

In preferred embodiments of the prepurification system, the comparatively strong adsorbent is NaY and the comparatively weak adsorbent is activated alumina.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

The present invention reduces the cost of the product(s) obtained from adsorption separation processes. It has been found that adsorbent effectiveness can be surprisingly improved by mixing a weak and strong adsorbent (compared to either adsorbent used individually) in such proportions in the main adsorption zone so as to reduce the thermal swing between adsorption and desorption steps.

Figure 1:
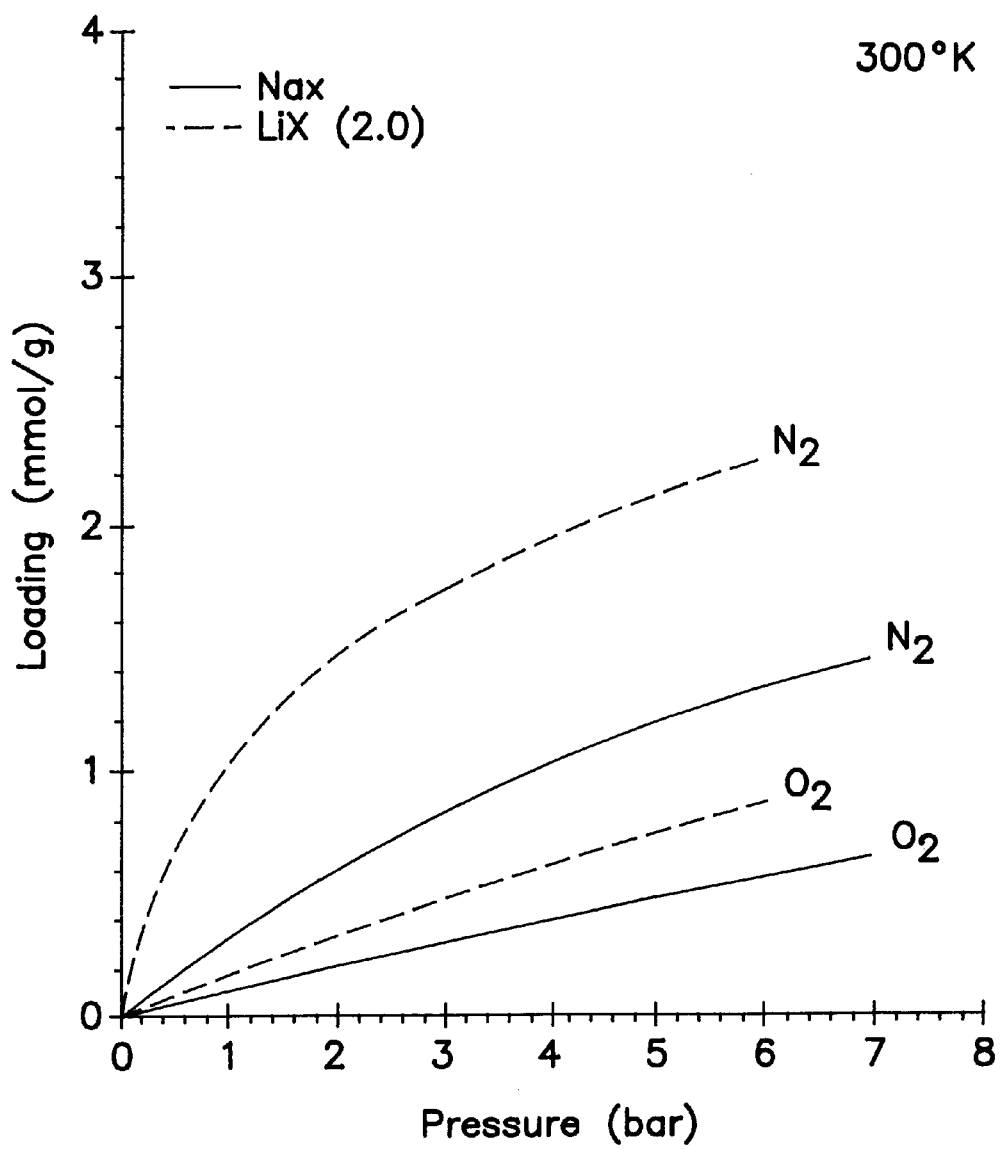
FIG. 1 is a graph of the adsorption isotherms for NaX and LiX adsorbents.
Figure 2:
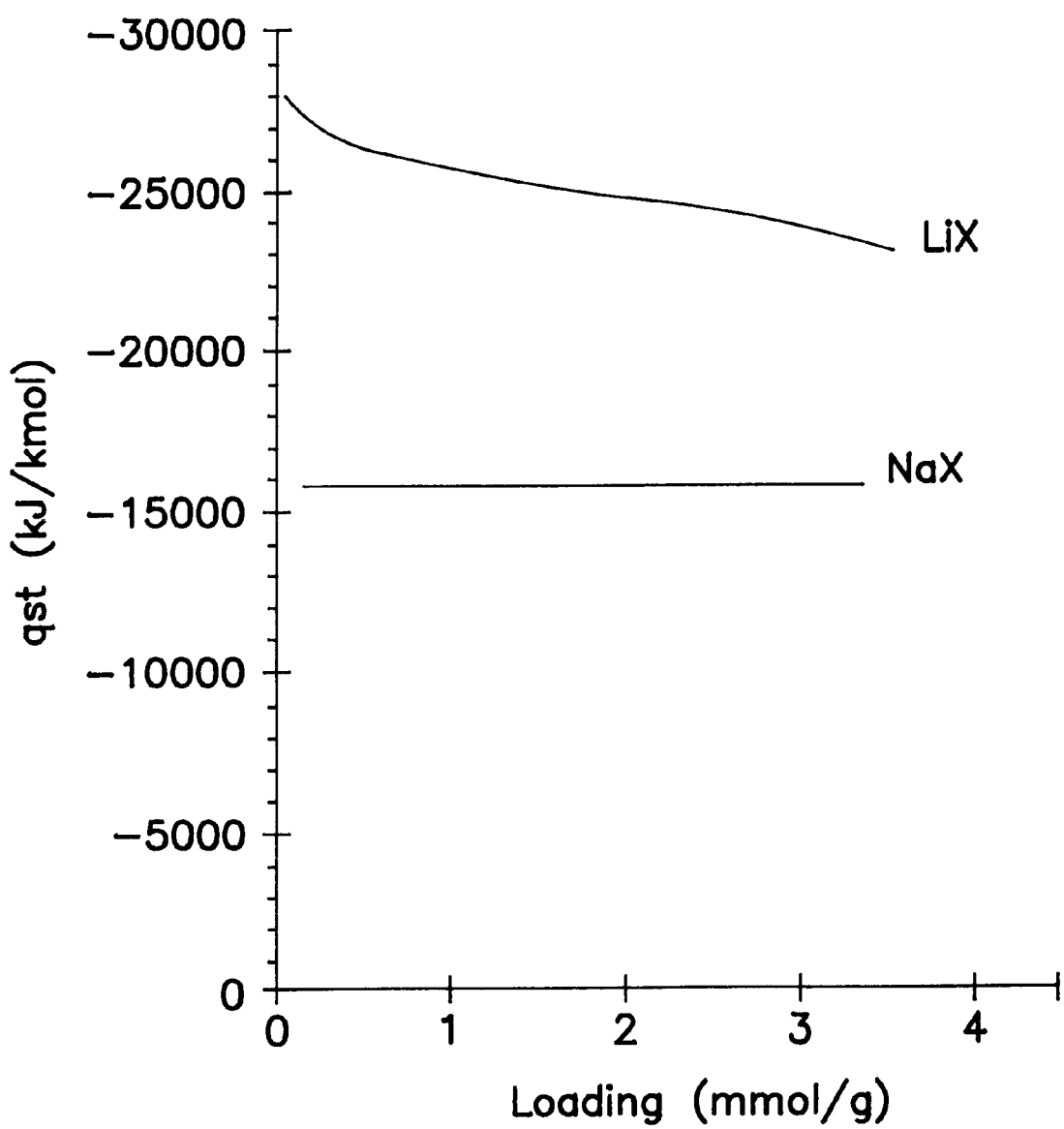
FIG. 2 is a graph of the isosteric heats of adsorption for nitrogen adsorbed on LiX and NaX adsorbents.

In this disclosure, the terms "strong" and "weak" refer to the relative strength or amount of the heavy component adsorbed and the relative heats of adsorption of the heavy components for two or more adsorbents. The heavy component in a fluid mixture is that component which is most favorably adsorbed (adsorbed with the largest loading) compared to the other lighter components in the mixture. Unless there is some molecular size exclusion of fluid components by the adsorbent, the highest heat of adsorption will generally be associated with the heavy component. These characteristics are demonstrated in FIG. 1 and FIG. 2 for $N_2$ and $O_2$ adsorbed on NaX and LiX ($SiO_2/Al_2O_3$ ratio=2.0) adsorbents. Nitrogen is the heavy component for both adsorbents, while LiX is the strong adsorbent and NaX is the weak adsorbent according to the 300° K isotherms shown in FIG. 1. The strong LiX adsorbent also has a higher heat of adsorption ($\Delta H_{N2}$) compared to that for NaX as illustrated in FIG. 2. Higher heat of adsorption in this document means the larger absolute value of the heat of adsorption.

Mixing a weak adsorbent (low heavy-component heat of adsorption) with a strong adsorbent (high heavy-component heat of adsorption) results in a lower local adsorption temperature and a higher local desorption temperature. Thus, the thermal swing is reduced at each section of the adsorber, and consequently, the heavy component working capacity increases for the strong adsorbent. The net effect upon the heavy component working capacity depends upon the relative amounts of strong and weak adsorbents in the mixture, but surprisingly it is possible to increase both the working capacity and working selectivity of the mixture over that of the individual adsorbents for the same process conditions. On the other hand, adsorbent mixtures which result in a lower overall process performance may still be desirable if the net reduction in cost of adsorbent more than offsets the cost penalties of the lower performance. On the whole, however, the impact upon process cost is greatest when the ratio of the costs of the individual adsorbents in the mixture is large.

As will be discussed in more detail below, mixing of adsorbents in accordance with the teachings of the invention may be applied to a wide variety of separations, e.g. the production of $O_2$ from air, the recovery of $CO_2$ from flue gas or $H_2$ tail gas, and air prepurification.

Figure 3A:
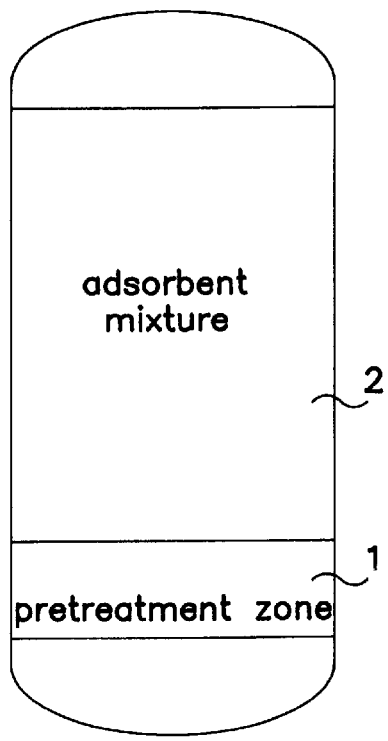
FIGS. 3a and 3b are schematic diagrams of embodiments of the invention.
Figure 3B:
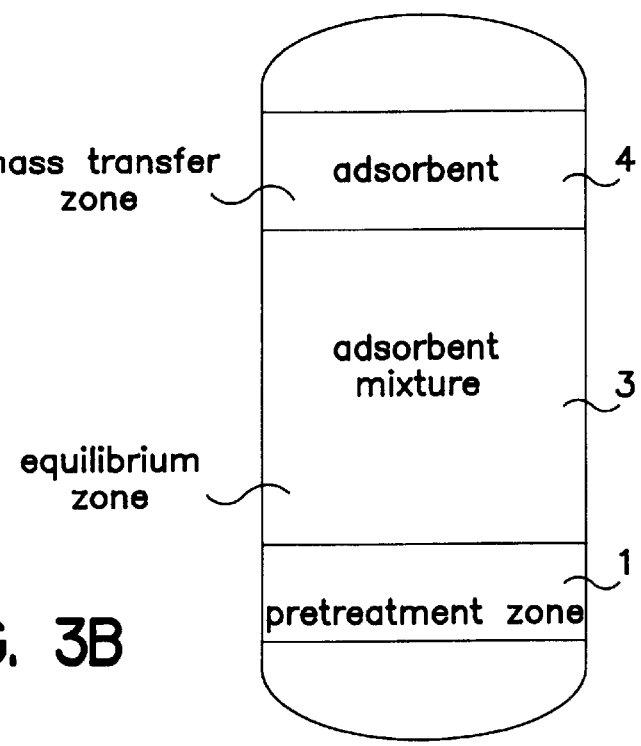

Adsorbents are deployed by the method of this invention in distinct adsorption zones as illustrated in FIGS. 3a and 3b. One or more adsorbents may be contained in each zone. The pretreatment zone 1 is nearest the feed inlet and its purpose is to remove any undesirable contaminants from the feed stream. Typical contaminants in air separation are water and carbon dioxide. Those skilled in the art will appreciate the use of zeolites, activated alumina, silica gel as well as other appropriate adsorbents in the pretreatment zone. The main adsorbent zone 2 follows the pretreatment zone. In FIG. 3a, the main adsorbent zone, which includes both an equilibrium zone and a mass transfer zone, contains a mixture of adsorbents selective for the primary heavy components in the feed. FIG. 3b likewise has a pretreatment zone 1. However, this embodiment differs from that in FIG. 3a in that the mixture layer is in the equilibrium zone 3, and the mass transfer zone 4 comprises a layer of the strong adsorbent.

Any of the heavy and/or light component(s) may be desirable products in the processes of this invention. The most preferred single adsorbent for a particular separation should possess high working capacity and high working selectivity. However, such a preferred adsorbent is usually costly and is often accompanied by high heat of adsorption and a significant adverse thermal swing in the separation process. Mixing a weaker and less costly adsorbent with the preferred (stronger) adsorbent can result in an overall lower product cost if the adsorbent mixture results in no significant penalty to process performance.

The adiabatic separation factor concept has been employed in order to evaluate the potential bulk separation performance of various adsorbents and their mixtures. The concept of adiabatic separation factor is discussed in commonly assigned, copending application Ser. No. 08/837,411 which relates to evaluating and selecting adsorbents for layered beds for bulk gas separations.

The method of adsorbent evaluation is important to the selection of adsorbents for the mixture in the main adsorbent zone. The objective of such evaluation is to estimate the separation behavior of each individual adsorbent at or near actual process conditions. This is accomplished by defining adiabatic separation factor ($\alpha$) and working capacity ($\Delta X$) as given in Equation (1) for the example of a binary fluid composition.

$$\alpha = \frac{\Delta X_j}{\Delta X_k} \quad (1)$$

$$= \frac{L_j(y_t, p_H, T_1)_{ads} - L_j(y_t, p_L, T_2)_{des}}{L_k(y_t, p_H, T_1)_{ads} - L_k(y_t, p_L, T_2)_{des}}$$

In Equation (1), the amount of adsorbate or loading (L) is evaluated for each constituent at the temperature, pressure and composition prevailing in the bed at the end of the adsorption and desorption steps in an adiabatic process. The terms in the numerator and denominator of Equation (1) represent the heavy (j) and light component (k) working capacities, respectively. The parameters (y,p,T) represent composition, pressure and temperature, respectively. The subscripts (H, 1) and (L, 2) denote end of adsorption and end of desorption, respectively. This evaluation is accomplished using any appropriate multicomponent isotherm model, e.g. the loading ratio correlation (Yang, *Gas Separation by Adsorption Processes*, 1987). Any such model, of course, requires some representative adsorption data for the fluid components of interest. The temperature swing ($T_1-T_2$) can be determined from experiment, adiabatic process simulation, or estimated by applying a simple energy balance. This analyses assumes equilibrium throughout the adsorbent bed at the end of the adsorption and desorption steps.

Equation (1) has been applied to an air separation process to determine the variation in separation factor with temperature when the adsorption and desorption pressures are 1.5 bar and 0.3 bar, respectively. The results are given in FIG. 4, in which the temperature on the abscissa represents the bed temperature at the end of the adsorption step ($T_1$).

Figure 4:
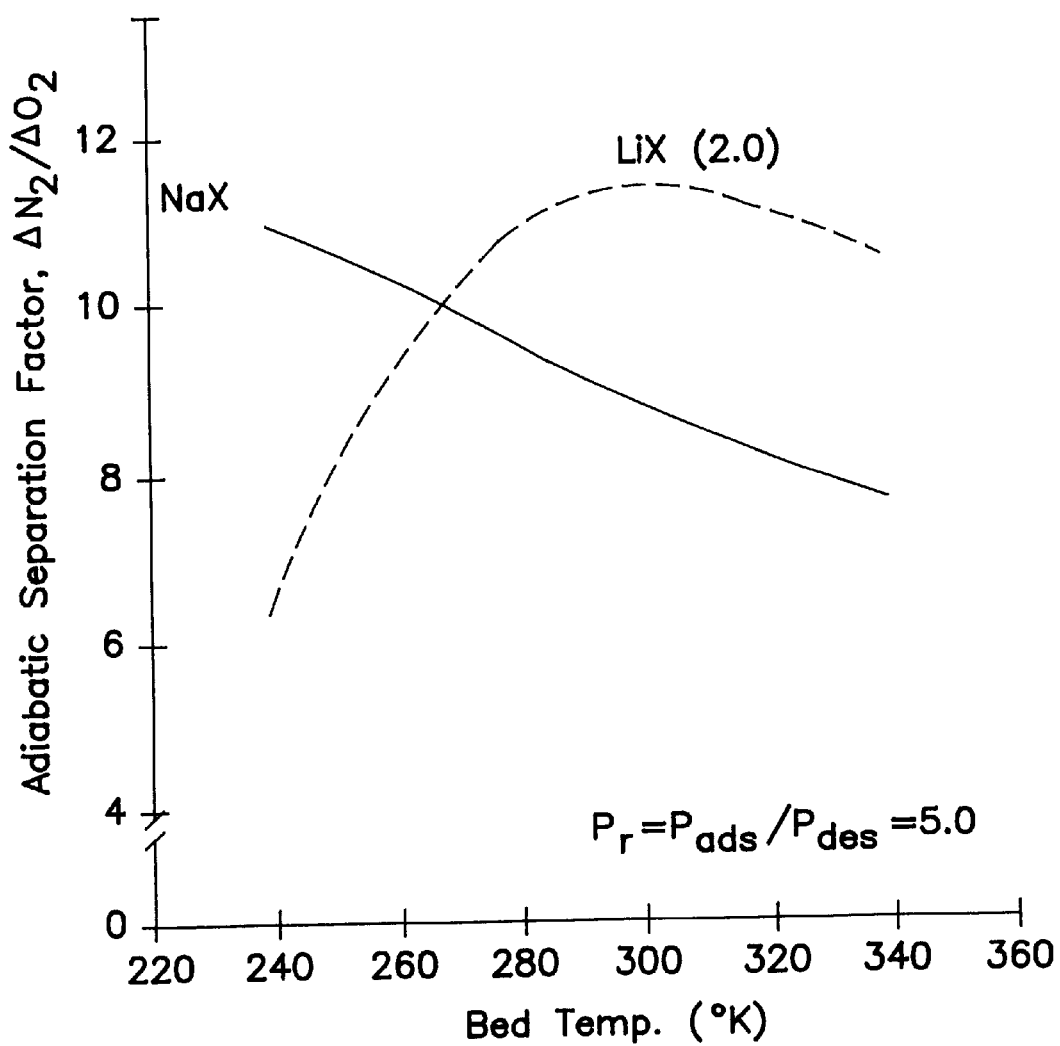
FIG. 4 is a graph showing the variation of adiabatic separation factor for LiX and NaX with bed temperature ($T_1$).
Figure 5:
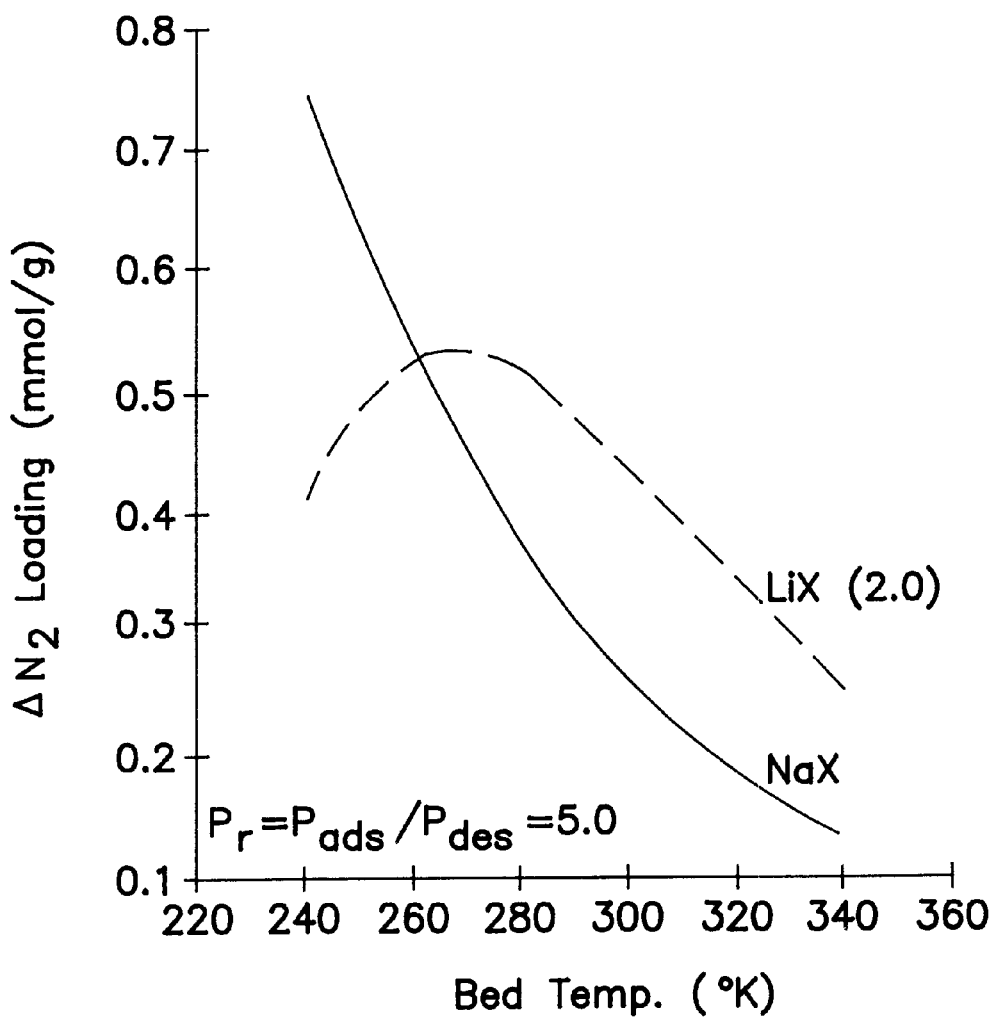
FIG. 5 is a graph showing the variation of adiabatic $N_2$ working capacity for LiX and NaX with bed temperature ($T_1$).

In addition to the adiabatic separation factor shown in FIG. 4, the adiabatic $N_2$ working capacity ($\Delta N_2$) is also important to process performance. The ($\Delta N_2$) for LiX is greater than that for NaX for bed temperatures greater than about 265° K and less than the working capacity of NaX for temperatures less than 265° K as shown in FIG. 5. This example illustrates the importance of evaluating adsorbents according to their expected behavior under adiabatic process conditions in contrast to comparing only single point loadings from isotherms such as those in FIG. 1.

In the present air separation example, the weaker NaX adsorbent is actually the preferred adsorbent for low temperature (<265° K) applications. The adiabatic working capacity, the adiabatic separation factor and/or the product of these two parameters may be used in the selection of a preferred adsorbent.

The benefits of this invention depend upon mixing two or more adsorbents with somewhat different loading and thermal characteristics. Furthermore, the weak adsorbent must not be inert and both materials must be adsorbents with non-zero working capacities of the heavy component, i.e. for both the strong (A) and weak (B) adsorbents:

$$[\Delta X_j]_A > 0$$

$$[\Delta X_j]_B > 0 \qquad (2)$$

To emphasize the fact that the weak adsorbent has a on-zero heavy-component working capacity, it is referred that:

$$[\Delta X_j]_B \geq 0.05[\Delta X_j]_A \qquad (3)$$

Finally, both the strong(A) and weak(B) adsorbents must exhibit equilibrium separation capability (selectivity)in bulk gas separations for the heavy over the light components:

$$\alpha_A > 1.0$$

$$\alpha_B > 1.0 \qquad (4)$$

As a first approximation, the adiabatic separation analyses can be applied to prospective adsorbent mixtures. The analyses described above is applied individually to the strong and weak adsorbents. However, the thermal swing is estimated for the mixture as the weighted average temperature difference ($T_1-T_2$) of the individual adsorbents at the process conditions of interest, i.e. individual adsorbent thermal swings weighted by the proportion of each adsorbent in the mixture. Likewise, the adsorbate loadings for the adsorbent mixture are the weighted averages of the individual loadings. For example, the adsorbate loading for a mixture of two adsorbents would be computed as follows:

$$(\Delta X_i)_{mix} = \gamma(\Delta X_i)_A + (1-\gamma)(\Delta X_i)_B \qquad (5)$$

where $\gamma$ is the fraction of the strong adsorbent (A) in the mixture and the loadings $\Delta X_j$'s are determined as shown in Equation (1) for each adsorbate/adsorbent combination. The best bulk gas separation process performance can be expected to correspond to the highest working capacity and highest separation factor determined for either the individual or mixed adsorbents. Either the separation factor ($\alpha$) or the product of the separation factor and heavy component working capacity ($\alpha \Delta X_j$) are good indicators of maximum bulk separation process performance.

This evaluation only approximates the performance of that part of the bed that behaves in a pseudo-equilibrium manner. Those skilled in the art will recognize that there may be a dynamic region (mass transfer zone) in the adsorbent bed which detracts from the overall process performance. Several non-limiting examples illustrate the use of adsorbent mixtures for bulk separations according to the invention.

EXAMPLE 1

Figure 6:
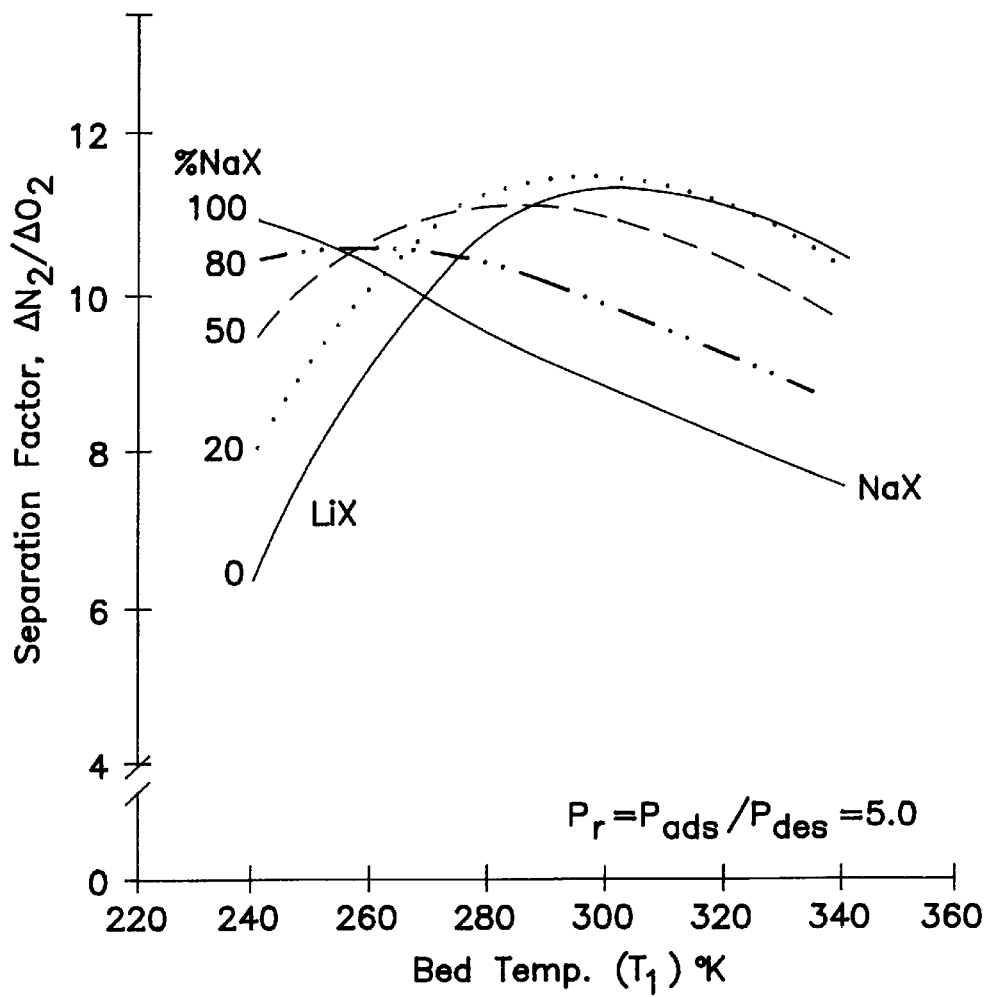
FIG. 6 is a graph showing the variation of adiabatic separation factor for LiX/NaX mixtures with bed temperature($T_1$).

The mixing of LiX (2.0) with NaX has been evaluated for use in an air separation process whereby the light component, $O_2$ is the desired product and the heavy component is $N_2$. These are the same adsorbents for which characteristics are shown in FIGS. 1,2,4,5. The adiabatic separation factor analyses yields the results given in FIG. 6 for uniform adsorbent mixtures of 20%, 50%, and 80% NaX with the balance of LiX. Mixtures are determined on a wt. % basis. Adsorption (1.5 bar, $yO_2=0.22$, $yN_2=0.78$) and desorption (0.3 bar, $yO_2=0.05$, $yN_2=0.95$) conditions served as representative process conditions for this analysis. The single adsorbent thermal swings ($T_1-T_2$) are 14K and 6K for LiX and NaX, respectively. FIG. 6 shows the variation in adiabatic separation factor as a function of the bed temperature, i.e. ($T_1$) is determined at the end of the adsorption step. Clearly, the mixture performance is not a simple average of the individual adsorbent performances. Surprisingly and unexpectedly, these results indicate superior air separation performance for a mixture of 20% NaX and 80% LiX for a range of bed temperatures from 270° K to 320° K, i.e. better selectivity and working capacity for the mixture than for either of the individual adsorbents. There is very little deterioration in performance of this mixture up to 340° K. Such enhancements (relative to the mixture mass) are highly unlikely for any mixture consisting of an adsorbent and an inert material.

In the narrow range of 255° K to 275° K, a 50%/50% mixture of the adsorbents is preferred while the single adsorbents (no mixing) is preferred in the low (NaX) and high (LiX) temperature regimes. Additionally, the 50%/50% mixture is preferred for temperatures above 270° K. FIG. 6 suggests only a 5%–7% degradation in separation factor (product recovery) for this 50%/50% mixture at temperatures above 290° K.

Since NaX is only a fraction of the cost of LiX, this 50%/50% mixture may result in overall product cost savings. The results of FIG. 6 also show that adsorbent mixtures can moderate the change in separation efficiency with changes in temperature. This feature can be applied to improve the operating stability of processes that must function in regions of varying temperature.

The results of FIG. 6 were obtained at a pressure ratio of 5.0, i.e. ratio of adsorption to desorption pressures. A similar analysis was performed for LiX/NaX mixtures at a pressure ratio of 3.0 using the same adsorption pressure of 1.5 bar as in FIG. 6. The results for both pressure ratios are summarized in Table I showing the preferred adsorbent mixtures as a function of both pressure ratio and bed temperature. Table I provides general guidance with respect to NaX/LiX ratios for air separation. This Table is not intended to limit the scope of the invention.

EXAMPLE 2

The mixing of activated alumina ($Al_2O_3$) with NaY has been evaluated for use in the recovery of $CO_2$ from combustion flue gas whereby the heavy component, $CO_2$ is the desired product and the predominant light component is $N_2$. NaY is the much stronger adsorbent and has the largest working capacity for the heavy component, however, the activated alumina has a larger adiabatic separation factor ($\Delta CO_2/\Delta N_2$). For this reason, the product of separation factor and heavy component working capacity provides the best measure of mixture effectiveness.

Adsorption (105 kPa, $yCO_2 0.12$, $yN_2=0.88$) and desorption (6 kPa, $yCO_2=0.80$, $yN_2=0.20$) conditions served as representative process conditions for the adiabatic separation factor analysis. The single adsorbent thermal swings ($T_1-T_2$) are 9.8K and 1.2K for NaY and $Al_2O_3$, respectively.

Figure 7:
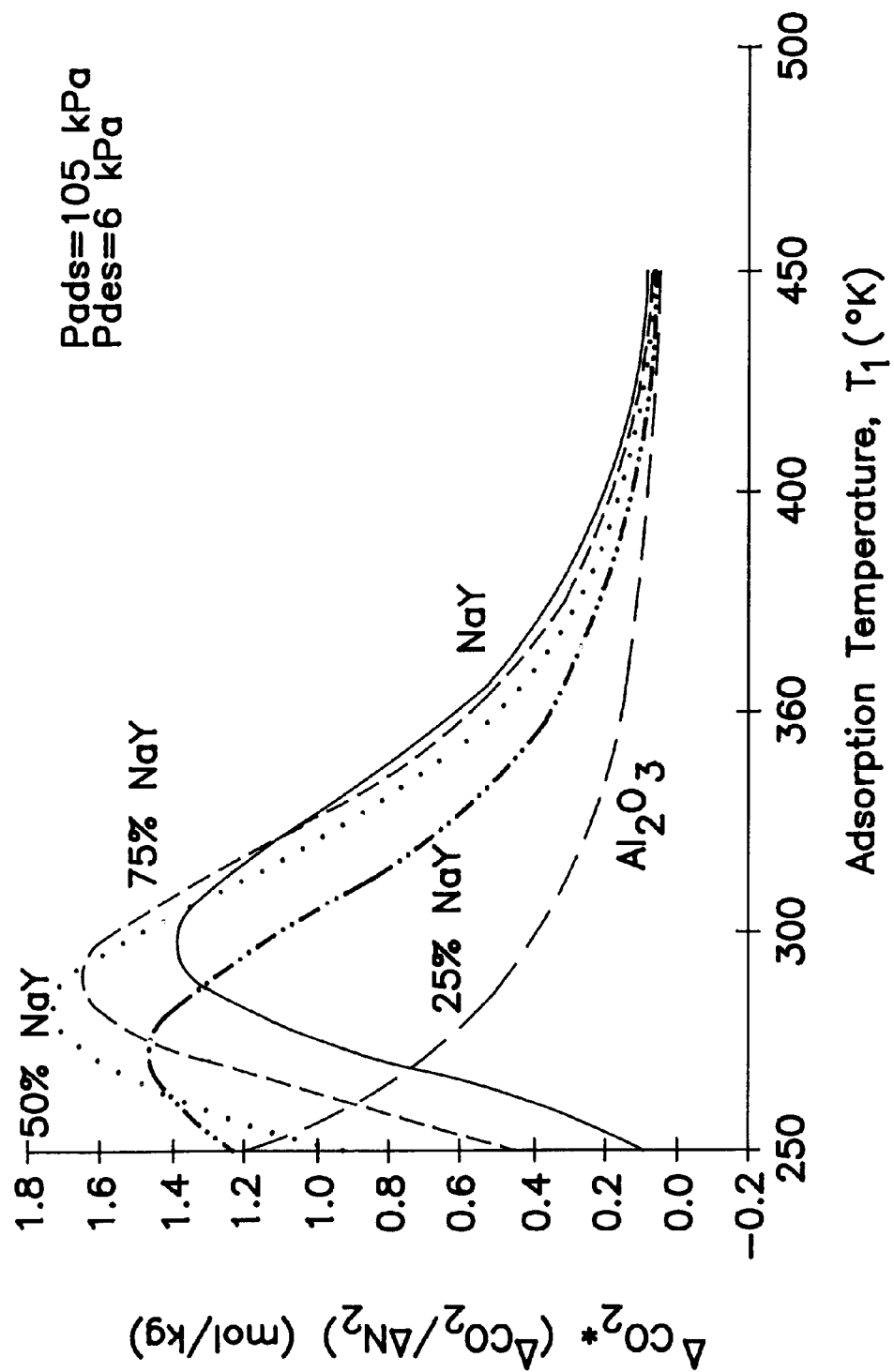
FIG. 7 is a graph showing the variation of the product of separation factor ($\alpha$) and $\Delta CO_2$ loading with bed temperature ($T_1$) for $NaY/Al_2O_3$ mixtures.

Results of the analysis for adsorbent mixtures (NaY/$Al_2O_3$) containing 25 wt. %, 50 wt. % and 75 wt. % NaY are given in FIG. 7. The preferred mixture varies with bed temperature ($T_1$), with maximum performances occurring in relatively narrow temperature ranges for each adsorbent mixture. For temperatures above 300° K, mixtures containing 25% of the less costly alumina are predicted to suffer almost no reduction in process performance. Even mixtures containing 50% alumina show only a modest reduction in expected separation performance.

The most desirable ratio of adsorbents in the mixture depends heavily upon the process operating temperature for temperatures below 300° K. This analysis was repeated for other adsorbents for $CO_2$ feed concentrations extending to 60 mol. % and $CO_2$ product purities to 90 mol. %. NaY/$Al_2O_3$ mixtures were found to be the best choice for operating temperatures up to 350° K, while NaX (2.0 or 2.3)/Al$_2$O$_3$ mixtures are preferred at temperatures above 350° K.

EXAMPLE 3

VPSA air separation process tests were performed in a pilot plant to evaluate adsorbent mixtures similar to those described in Example 1. A VPSA process, producing 90% purity O$_2$ and utilizing cycle steps as described in U.S. Pat. No. 5,702,504, was employed to test 13X HP (NaX (2.5)), LiX (2.0) adsorbents and mixtures thereof. Adsorption and desorption pressures were 1.43 bar and 0.3 bar, respectively. The bed depth (1.4 m) and feed rate were maintained constant for all individual adsorbent and adsorbent mixture tests. Cycle times were varied as required to achieve O$_2$ product at 90% purity. 13X HP and LiX (2.0) adsorbents (available from UOP of Des Plaines, Ill. USA) were first tested individually. Mixtures of these two adsorbents, consisting of 20 wt. % 13X HP/80 wt. % LiX and 50 wt. % 13X HP/50 wt. % LiX, were also tested. The O$_2$ product recovery, bed size factor (BSF) and power for each test were normalized to the results for the LiX (2.0) adsorbent. Results are summarized in Table II.

The performance of the process using the 20 wt. % 13X HP/80 wt. % LiX mixture shows modest degradation in product recovery, BSF and unit power consumption compared to the process using only the high performance LiX (2.0) adsorbent. All of these performances are degraded more substantially for the 50 wt. % 13X HP/50 wt. % LiX mixture. These results are in general agreement with the predictions of the adiabatic separation analyses, however, the test results also reflect the nonequilibrium effects upon overall performance, i.e. the model only addresses the equilibrium zone performance, while the test results also include the effects of the mass transfer zone.

EXAMPLE 4

Finally, the pilot tests in Example 3 were extended to include a layer of the strong adsorbent LiX (2.0) in place of the adsorbent mixture in the transfer zone region of the bed. It was previously determined in commonly assigned, copending application Ser. No. 08/837,411 that the mass transfer zone for this process (as defined at the end of the adsorption step) represents approximately 25% of the total main adsorbent mass. Since the adsorption behavior in the mass transfer zone is expected to be different from that in the remainder of the bed (equilibrium zone), the adsorption characteristics preferred for this zone may be different than those that work best in the equilibrium zone.

To test this concept, 25% of the adsorbent mixture nearest the product end of the bed was replaced with LiX for the two mixtures of Example 3. The new configuration is shown in FIG. 3b (described above). These configurations were tested at the same conditions described in Example 3. The results are shown in Table II.

Replacing the top layer of the mixture with LiX (2.0) resulted in only a small increase in product recovery and almost no change in the BSF and power for the 20 wt. % 13X HP/80 wt. % LiX mixture. Thus, the relatively small amount of the weak adsorbent had little influence upon the performance in the mass transfer zone. A much more significant effect was realized with the 50 wt. % 13X HP/50 wt. % LiX mixture when replacing the mixture in the transfer zone with LiX alone. Although performance remained lower than the case with only LiX in the entire bed, degradation in performance was much more modest when using the LiX in the mass transfer zone in place of the mixture. The signifi-cant overall reduction of the expensive adsorbent in this bed may reduce the overall product cost even at the slightly degraded performance, but this depends upon the cost ratio of the weak and strong adsorbents.

TABLE I

| Bed Temperature Range (° K.) | Amount in Mixture NaX (wt %) | Amount in Mixture LiX (wt %) | Pressure Ratio |
| --- | --- | --- | --- |
| 270–340 | 10–30 | 90–70 | 5.00 |
| 250–280 | 50.00 | 50.00 | 5.00 |
| <260 | 100.00 | 0.00 | 5.00 |
| 280–340 | 0–30 | 100–70 | 3.00 |
| 260–280 | 30–50 | 70–50 | 3.00 |
| <260 | 100.00 | 0.00 | 3.00 |

TABLE II

Normalized VPSA Pilot Plant Performance

| | O$_2$ Recovery | BSF | Power |
| --- | --- | --- | --- |
| 13X HP | 0.43 | 2.7 | 2.2 |
| LiX (2.0) | 1.0 | 1.0 | 1.0 |
| LiX (2.0)/13X HP 80/20 Mix | 0.94 | 1.08 | 1.03 |
| LiX (2.0)/13X HP 75% (80/20 Mix) + 25% LiX (2.0) | 0.97 | 1.08 | 1.03 |
| LiX (2.0)/13X HP 50/50 Mix | 0.85 | 1.29 | 1.16 |
| LiX (2.0)/13X HP 75% (50/50 Mix) + 25% LiX (2.0) | 0.92 | 1.17 | 1.09 |

As can be seen from the above discussion, the present invention differs from the prior art in that the present invention mixes two or more adsorbents of different adsorption strengths, whereas the prior art mixed an adsorbent with an inert material. Thermal cycling is reduced in the adsorbent mixture because of the differences in both heats of adsorption and working capacities for the individual adsorbents. Unlike an inert, the weaker adsorbent contributes directly to the heavy component working capacity and therefore helps to maintain low bed size.

The use of either low or high heat capacity inerts by the prior art is accompanied by the distinct disadvantages of lower storage selectivity, lower heavy component working capacity per unit volume of bed, larger adsorber beds and greater bed pressure drop.

Lower storage selectivity is the result of the greater amount of non-selective void space per unit weight of active adsorbent when inerts are added. Void space between particles (active and/or inert) is non-selective because it has no separation capability. Increasing the non-selective voids in the beds reduces the product recovery and may also contribute to lower product purity. Since the mass of active adsorbent per unit bed volume decreases with the addition of inerts, the bed length must be extended to process the same quantity of feed fluid per unit time. This is the result of a reduction in the heavy component working capacity per unit volume of bed, even though the heavy component working capacity per unit mass of adsorbent may increase for some dilution fractions. Once the mass of the inert is included, the heavy component working capacity per unit mass of the mixture decreases compared to that of the adsorbent alone. This is a key difference from mixtures of strong and weak adsorbents, where the working capacity per unit mass of mixture can actually be greater than the working capacity of either of the individual adsorbents. The larger bed depth required when inerts are used translates into greater pressure drop, larger vessels and higher unit power consumption for a given feed flow. High heat capacity inerts are high density materials. The added weight of these materials in the adsorber vessel may require higher strength bed supports and foundations. Such inerts can be quite expensive as well. These disadvantages are either non-existent or significantly minimized for the mixture of strong and weak adsorbents.

In the case where inerts are added to fill the voids between active adsorbent particles, the reduction of void space leads to a significant increase in the local flow velocity. This results in a much greater pressure loss across the adsorber bed. The adsorbents used in the present invention have similar physical properties such that the interparticle void fraction and thermal conductivity and specific heat of the mixture are similar to those for a bed consisting only of an individual adsorbent. The density of the components in the mixture may differ more than these other properties, so that the mixture density will be close to an average of that of the component adsorbents.

Mixtures of two or more adsorbents are potentially applicable to any fluid separation. Recovery of either the heavy or the light component as product from a fluid mixture has been demonstrated using air separation ($O_2$ product) and $CO_2$ recovery from flue gas, respectively, as examples of bulk separations. Co-products processes, whereby both heavy and light components are recovered as products, may also utilize adsorbent mixtures.

Adiabatic separation factors and heavy component working capacities are established for individual adsorbents at the process conditions of interest for bulk gas separations. Strong and weak adsorbents are selected on the basis of relative heavy component heats of adsorption and the criteria in Equations (2) and (4). The best mixture candidates are evaluated for different proportions of adsorbents using the same adiabatic separation methodology applied to the individual adsorbents. The best mixtures are identified as those that improve process performance and/or reduce product cost. Another feature of the present invention is the greater thermal stability of mixtures compared to that of the individual adsorbents. When adiabatic separation factor or working capacity change significantly with small or moderate changes in process operating temperature, the process becomes less stable and it is more difficult to maintain productivity at the desired level. Mixing adsorbents with different thermal behaviors results in more moderate changes in performance with changes in temperature.

The above examples represent separations with modest to small thermal swings. Adsorbent mixtures may be applied with even more significant effect upon process performance when the process thermal swing is large.

The concepts relied upon with respect to the mixtures may similarly be applied to composite materials comprising two or more adsorbents. Composite materials identified in the prior art typically consist of one or more adsorbents and an inert binder. Such materials are physically and/or chemically bonded into an integral adsorbent structure (bead, pellet or preform, etc.). These composites and their method of manufacture have been developed individually for specific separation processes. Prior art composites containing more than one adsorbent fail to show any decrease in the process thermal swing resulting from the mixture of adsorbents. While other adsorption process performance factors have been shown to improve as a result of the composite, such improvements have been attributed to enhancements to the properties of the composite relative to those of the individual adsorbents. In other words, the processing of the individual adsorbents and inert binders results in a composite with properties different than can be attributed to those that would represent a simple average of its constituents. In the present invention performance improvements occur as a result of changes in the local process conditions that are induced by the simple combination of adsorbents; whereas in the use of prior art composites, process improvements are the direct result of superior properties of the composite compared to the properties of its raw adsorbent ingredients. Deployment of the present invention does not depend upon combining individual adsorbents integrally into a composite structure, although such deployment is not precluded by this invention. Rather, the present invention may be practiced by combining individual adsorbents as a simple admixture in an adsorber.

While the discussion above is directed at adsorption processes for bulk separations, some of the same concepts may be extended to purification processes for the removal of contaminants in low to trace concentrations. An example of such a process is the prepurification of air prior to cryogenic separation. Both TSA and PSA prepurification processes have been applied in the prior art to remove water, carbon dioxide and light hydrocarbons from an air feed stream.

While PSA prepurification requires no thermal regeneration or feed chilling as in TSA prepurification, desorption is more difficult than in TSA processes. As a result, more purge gas is required and removal of light hydrocarbons such as acetylene is more difficult. The prior art has addressed these problems by providing a compound adsorbent bed consisting of a layer of activated alumina for removal of all of the water and most of the $CO_2$ followed by a short layer of 13X molecular sieve for final $CO_2$ cleanup and removal of acetylene. However, this configuration and choice of adsorbents results in high power consumption due to significant blowdown loss and high purge requirement.

These problems have been partially addressed by replacing the strong 13X adsorbent with a less strong NaY adsorbent, as disclosed in parent U.S. patent application Ser. No. 08/766,443 (Leavitt). The resulting configuration shown in FIG. 8 (described below) retains the benefits of the weak alumina layer in providing good $H_2O$ and $CO_2$ working capacities while reducing the coadsorption of light $N_2$ and $O_2$ products by using NaY as the strong adsorbent. Furthermore, $C_2H_2$ is removed preferential to $CO_2$ so that a $CO_2$ breakthrough represents a precursor to $C_2H_2$ breakthrough. This provides an operational safety advantage due to the low level criteria for $CO_2$ breakthrough, i.e. <0.25 ppm $CO_2$. In other words, the process can be simply controlled on the basis that little or no $CO_2$ breakthrough insures complete retention of $C_2H_2$.

While the combination of a weak alumina adsorbent layer followed by a strong NaY layer provides significant advantages over prior art air prepurification, the use of adsorbent mixtures according to the present invention provides even greater benefits. Coadsorption of light product components $N_2$ and $O_2$ and the associated thermal swing can be reduced by replacing the strong adsorbent layer and a portion of the weak adsorbent layer with a layer consisting of a mixture of strong and weak adsorbents. This mixture may be in the form of an admixture of individual adsorbents or a composite which incorporates the strong and weak adsorbents into agglomerated structures such as beads or pellets.

Figure 9:
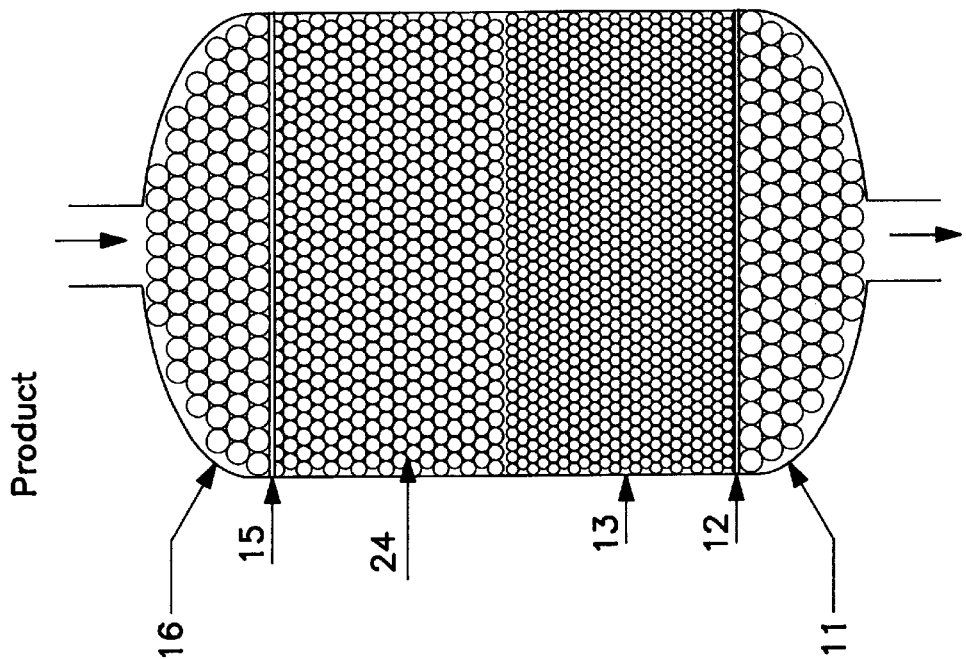
FIG. 9 is a schematic diagram of an embodiment of the invention wherein an alumina adsorptive layer is followed by an adsorptive layer having a mixture of two adsorbents.

The adsorption of the light components of air ($N_2$ and $O_2$ are light compared to $H_2O$, $CO_2$ and $C_2H_2$) on the discrete strong adsorbent layer can be minimized and the undesirable thermal swing can be reduced by employing an adsorbent mixture layer to improve overall performance. The strong and weak adsorbents are defined according to Equations (2) and (3) (above) and the heavy component heats of adsorption. For the purpose of selecting adsorbents for mixtures for air prepurification, $CO_2$ and $N_2$ are chosen as the representative heavy and light components, respectively. Equations (1) and (4) (above) are directed at bulk separations and are not relevant to purification processes where the primary heavy components are present only in low to trace concentrations in the feed. Applying these concepts to establish an adsorbent mixture containing NaY and alumina results in greater retention of the heavy $CO_2$ and $C_2H_2$ components. This improvement is achieved by providing a final layer of mixed strong and weak adsorbents in place of the aforementioned discrete layer of strong adsorbent only, and by extending the function of this final layer to include substantial $CO_2$ removal as well as trace or final $CO_2$ cleanup. Of course, the preferential removal of $C_2H_2$ over $CO_2$ is preserved by maintaining a sufficient proportion of the strong adsorbent in the mixture. This configuration involving a layer of weak adsorbent followed by an adsorbent mixture layer is illustrated in FIG. 9 (discussed below). Overall prepurifier performance is improved in terms of lower blowdown losses, lower purge requirement and lower power consumption. Other benefits and specific examples of the invention are described below.

Selection of the strong adsorbent for the product end of the bed is critical to the invention. The adsorbent must sufficiently remove acetylene and other hydrocarbons in preference to $CO_2$ such that $CO_2$ breaks through the bed ahead of acetylene, a gas which is hazardous to plant operation. In addition, coadsorption of $N_2$ and $O_2$ should be minimized at the process operating conditions. Finally, the strong adsorbent must be self-cleaning with respect to acetylene, i.e. the process must be capable of desorbing all of the $C_2H_2$ introduced to the adsorber in each cycle after reaching a cyclic steady state.

Compared to activated alumina, NaY is a strong adsorbent. Isothermal breakthrough tests of individual adsorbents indicate that the equilibrium capacity of NaY for acetylene is about ten times greater than that of activated alumina. Furthermore, NaY preferentially adsorbs acetylene over $CO_2$ at the concentrations found in the feed of PSA prepurifiers, e.g. typically less than 1 ppm. However, NaY requires more purge than activated alumina for the effective desorption of acetylene.

A properly sized layer of NaY used in the product end of a layered PSA prepurifier (see FIG. 8, described below), containing activated alumina at the feed end to remove the bulk of the $CO_2$ and $H_2O$, significantly improves the performance and the economics of the cycle. For example, the $C_2H_2$ breakthrough capacity of a layered bed containing 20% NaY will be more than twice that of a bed of equal size containing only pure activated alumina. The amount of NaY used in the beds is also an economic issue. Optimization of the cycle will depend in part on the relative cost of power, the quantity of hydrocarbons to be removed, and the operating efficiency of the air separation plant being serviced.

Figure 8:
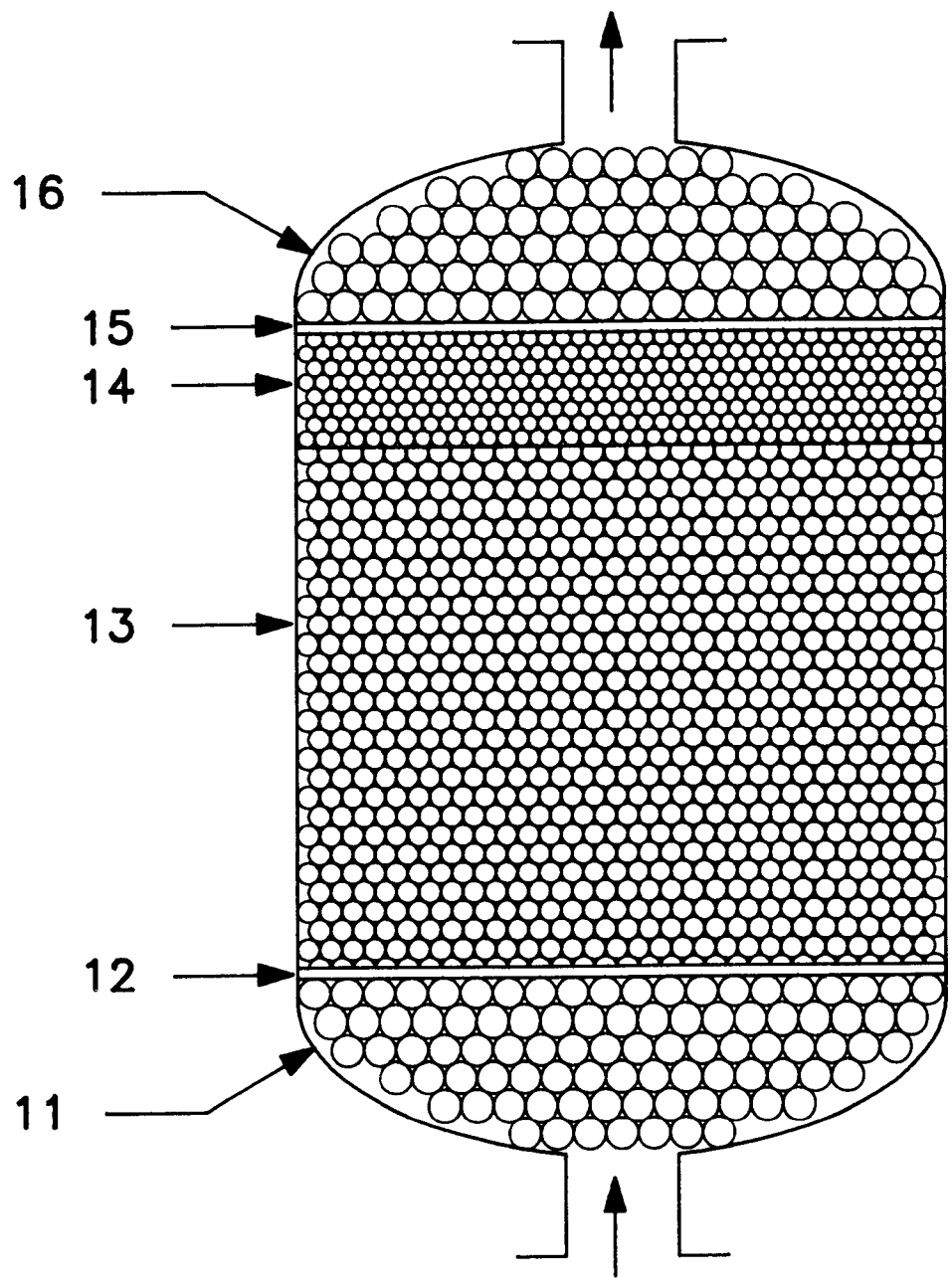
FIG. 8 is a schematic diagram of an embodiment of the invention wherein two adsorbents are in discrete layers.

The use of a mixture of NaY and activated alumina requires that both adsorbents be thoroughly dried prior to mixing. The NaY must be maintained in a dry state such that water loadings on the NaY are no greater than 4.0 wt %, more preferably less than 2.0 wt % and most preferably less than 0.8 wt %. If a discrete layer of activated alumina is used, as shown in FIGS. 8 and 9, then the layer of activated alumina at the feed end can be loaded and dried in-situ prior to loading the NaY or mixed layer containing NaY. In-situ drying of this first layer is accomplished by operating the PSA prepurifier at approximately 50% of its design cycle time for a period of approximately 22 to 24 hours. Short cycling the plant under these conditions insures the removal of all air contaminants in the product stream and dries the alumina to very low water loadings. One skilled in the art will appreciate that the length of time necessary to dry the alumina will depend on the size of the bed and the flow rate of the purge gas. The purge gas could also be heated to accelerate the drying process. When cycling the plant to dry the alumina layer, the preferred range of gas flow is 10% to 100% of the design loading, the more preferred case is 30% to 80% and the most preferred case is 40% to 60%. When the vessels are opened to load the NaY or mixture, a dry purge (air or other suitable gas) is introduced to prevent rehydration of the dry adsorbents.

An embodiment of the present invention is an improvement over the novel layered bed disclosed in U.S. patent application Ser. No. 08/766,443 in that the present invention comprises the use of a comparatively stronger adsorbent (preferably NaY) and a comparatively weaker adsorbent (preferably activated alumina particles) either mixed into a single zone or in the form of a composite particle. In a preferred embodiment of the layered bed, the stronger adsorbent is situated in the product end of the bed.

FIG. 8 shows a PSA prepurifier adsorbent bed according to the layered bed embodiment of U.S. patent application Ser. No. 08/766,443. The direction of fluid flow during the adsorption step is given by the arrows. In FIG. 8, the lower header is filled with inert ceramic balls 11 which act as both flow distribution and bed support. A stainless steel screen 12 supports the adsorbent bed. The bed itself consists of two layers. The lower and larger layer is activated alumina 13; the smaller upper layer is NaY 14. The upper bed surface is constrained by a second stainless steel screen 15 which is held in place by an additional layer of ceramic balls 16 which fill the upper header. The ceramic balls 11 and 16 can be graded to various sizes to provide improved flow distribution. The balls are not necessary to practice the invention.

According to U.S. patent application Ser. No. 08/766,443 the preferred ratio of NaY to activated alumina for a layered bed is between 5% NaY/95% activated alumina and 95% NaY/5% activated alumina. A more preferred ratio was between 10% NaY/90% activated alumina and 50% NaY/50% activated alumina. The most preferred ratio is between 10% NaY/90% activated alumina and 30% NaY/70% activated alumina. The above ratios apply to the discrete layered configuration, i.e. all of the alumina is in the layer nearest the feed end and all of the NaY is in the layer nearest the product end of the adsorber.

An embodiment of the improved prepurifier of the present invention comprises a layered configuration in which the layer nearest the product end of the bed comprises a mixture of NaY and alumina adsorbents. This is illustrated in FIG. 9 (common reference numbers refer to elements in common with FIG. 8). The layer 13 nearest the feed end of the bed contains only alumina. The amount of NaY in the mixed layer 24 should be no less than the minimum required in the discrete layered configuration. The function of the mixed layer 24 in FIG. 9 combines the functions of the NaY layer and part of the alumina layer in the configuration of FIG. 8. This mixed layer design offers significant performance advantages over the discrete layered prepurifier and is therefore preferred.

Figure 10:
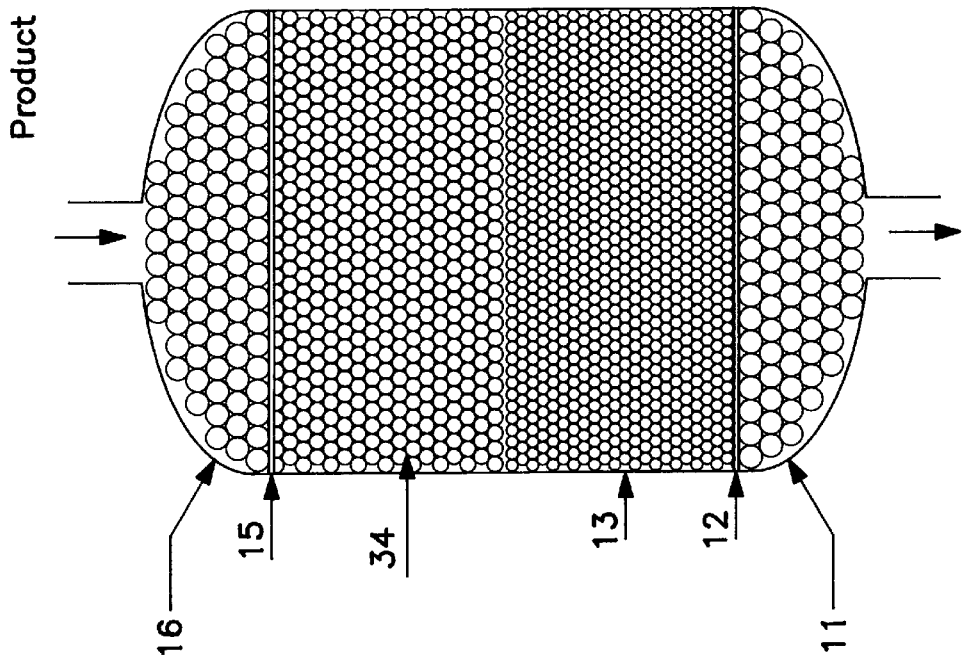
FIG. 10 is a schematic diagram of an embodiment of the invention wherein an alumina adsorptive layer is followed by an adsorptive layer wherein two adsorbents are combined into a composite adsorbent material.

The most preferred method of practice of the present invention is shown in FIG. 10 (common reference numbers refer to elements in common with FIG. 8). Here the layer 34 represents a layer wherein NaY and alumina may be contained in a composite adsorbent. The preparation of such a composite is disclosed in U.S. Pat. No. 5,096,871 (Lever).

In the mixed or composite adsorbent layer prepurifiers of the invention, the preferred ratio of NaY to activated alumina for a layered bed is between 5% NaY/95% activated alumina and 95% NaY/5% activated alumina. A more preferred ratio was between 10% NaY/90% activated alumina and 50% NaY/50% activated alumina. The most preferred ratio is between 13% NaY/87% activated alumina and 25% NaY/75% activated alumina.

The prepurifiers comprising the alumina/NaY mixtures and the alumina/NaY composite are preferred over the layered bed of U.S. patent application Ser. No. 08/766,443 in view of the fact that the former prepurifiers have increased capacity, increased process and cycle flexibility, reduced purge/feed ratios, reduced capital and energy costs. These configurations also result in higher productivity in the air separation unit (ASU), produce better ASU operational stability at high feed air temperatures and preferentially adsorb acetylene ($C_2H_2$) relative to $CO_2$.

EXAMPLE 5

Several tests were performed in a prepurifier pilot plant to compare the performance of the discrete layer (FIG. 8) and composite layer (FIG. 10) bed configurations. The composite layer was constructed with a composite adsorbent comprising 40% NaY and 60% activated alumina. The same total amount of adsorbent was included in each bed configuration and the proportion of each adsorbent also remained constant, i.e. 17.8% total NaY and 82.2% total alumina. The pilot facility included two adsorbers operating out of phase ( one bed in adsorption, the other bed in a sequence of blowdown, purge and repressurization). Each adsorber vessel is 8.26 cm diameter with an adsorbent bed depth of 2.13 m. A simple four-step cycle was used as indicated above (e.g. adsorption, blowdown, purge and repressurization) with no bed-to-bed interactions. Cycle step times were as follows: 25 min. for adsorption; 3.0 to 5.0 min. for pressurization, and 30 to 40 s for depressurization (blowdown). Performance was determined for various feed flow rates, temperatures, pressure and purge flow rates as summarized in Table III for the two bed configurations.

Comparing the two configurations in test Cases 1 and 2 for feed pressure of 10.0 bar and feed temperature of 314° K, the prepurifier bed containing the composite adsorbent was able to process 10.5% more air while requiring less purge and a lower breakthrough concentration of $CO_2$. The composite layer bed can process a similar amount of air with a significantly higher water content compared to the discrete layer configuration as shown by the results for Cases 3 and 4 where the feed temperature for Case 4 is 8K higher. This improved water duty is achieved with a lower purge requirement and no $CO_2$ breakthrough compared to the discrete layer bed. Similar results are evident at the lower feed pressure of 6.9 bar in Cases 5 and 6 where again the bed with the composite layer processes 19.3% more air when the amount of purge is held equivalent to that of the discrete layer bed. Once again, the $CO_2$ breakthrough is lower for the composite configuration. Substantial reductions in purge flow are also possible with the composite layer bed. This is illustrated by comparing composite Case 2 with composite Case 7 where a 15.6% reduction in feed air flow is translated into a 39.9% reduction in purge. This improvement is even more significant when comparing Case 7 with the discrete layer result in Case 1. In the Cases 1–7 there was virtually no breakthrough of acetylene.

In order to illustrate that the improved PSA prepurifier design preferentially adsorbs $C_2H_2$ over $CO_2$, a pilot test was performed with the inlet feed air seeded with approximately 0.33 ppm $C_2H_2$. The adsorption step was extended to allow a breakthrough of $CO_2$ to 10 ppm. The $C_2H_2$ was then measured and found to be <0.75 ppb as shown in Table III for Case 8, verifying the selectivity of $C_2H_2$ over $CO_2$ for the NaY/alumina composite. A similar result is obtained for the discrete layer configuration.

In all tests comparing the two bed configurations, the composite bed design outperformed the discrete layer design. The composite bed design results in a feed flow capacity increase up to 20%, lower purge/feed ratios, and better $CO_2$ retention when compared to the discrete layer design. Since the discrete layer design already represents an improvement over the prior art, the composite layer results are quite substantial when compared to prior art PSA prepurifiers. We should note that we expect that similar results to those discussed above would be obtained for a mixture layer having strong and weak adsorbents in the same ratio as the composite material.

The inventive prepurifier offers several advantages over known PSA prepurifiers. First, the invention provides for the removal of $C_2H_2$ from air to less than 1.0 ppb with consistent incipient breakthrough of the $CO_2$ adsorption front prior to $C_2H_2$ breakthrough. This provides a relatively simple means of insuring process safety, i.e. the prepurifier feed step is terminated at the beginning of the $CO_2$ adsorption front breakthrough. Another benefit of the invention as it relates to prepurification, is an increase in process flexibility that derives from operating at lower purge/feed ratios. This allows the production of more N2 and results in reduced energy costs. Combining these benefits with longer repressurization times decreases the pressure and flow disturbances to the cold box, the net result of which is reduced product purity fluctuations. Further, while the overall operating cost of the layered PSA bed is less than that of a bed with a single adsorbent, the operating cost of the mixed or composite bed is lower still than the layered bed alternative. This is in large part due to the longer adsorption step times and hence smaller blowdown losses experienced. Finally, the system requires no additional system hardware and can be implemented in existing vessels.

TABLE III

| Case | Feed End | Product End | Feed Flow mol/s | P/F % | Feed Temp ° K. | Feed Pres. bar | $CO_2$ Breakthrough PPM | $C_2H_2$ Breakthrough PPB |
|---|---|---|---|---|---|---|---|---|
| 1 | $Al_2O_3$ | NaY | 0.217 | 51.1% | 314 | 10 | 0.28 | — |
| 2 | $Al_2O_3$ | Composite | 0.240 | 48.7% | 314 | 10 | 0.09 | — |

TABLE III-continued

| Case | Feed End | Product End | Feed Flow mol/s | P/F % | Feed Temp ° K. | Feed Pres. bar | $CO_2$ Breakthrough PPM | $C_2H_2$ Breakthrough PPB |
|---|---|---|---|---|---|---|---|---|
| 3 | $Al_2O_3$ | NaY | 0.217 | 54.9% | 314 | 10 | 0.05 | — |
| 4 | $Al_2O_3$ | Composite | 0.217 | 49.8% | 322 | 10 | 0.00 | — |
| 5 | $Al_2O_3$ | NaY | 0.149 | 49.8% | 311 | 6.9 | 0.22 | — |
| 6 | $Al_2O_3$ | Composite | 0.177 | 50.0% | 311 | 6.9 | 0.00 | — |
| 7 | $Al_2O_3$ | Composite | 0.202 | 37.1% | 314 | 10 | 0.13 | — |
| 8 | $Al_2O_3$ | Composite | 0.157 | 39.5% | 311 | 5.8 | 10.00 | .725 |

The composite or mixed adsorbent compound bed prepurifiers will perform well at a variety of conditions including the following:

1. Low to moderate air feed pressures from 3.75 to 21.7 bar with a preferred range of 5.1 to 14.8 bar.
2. Low to moderate air feed temperatures from 278 to 345° K with a preferred range of 288 to 322° K.
3. Low to high purge to feed ratios from 25% to 65% with a preferred range of 35% to 50%.

The prepurification processes of the invention are not limited to the bed configurations set forth in FIGS. 8–10.

Alternate embodiments include placing a NaY layer anywhere in the bed where the $H_2O$ concentration is low enough to permit the selective adsorption of $C_2H_2$ over $CO_2$. The bed may also be completely filled with a composite adsorbent or mixed adsorbent. The mixed layer may be either a uniform or nonuniform mixture of alumina and NaY or the like. Alternatively, the alumina could be mixed with NaY or other adsorbent to create a mixed adsorbent bed layer at the feed end in conjunction with a layer of the composite adsorbent at the product end of the prepurifier. Although these arrangements are not optimal they will provide some advantage over the discrete NaY layer shown in FIG. 8. Finally, the prepurifier bed could be constructed with NaY alone. As noted previously, NaY will perform best in the product end of the bed. Of course, the amount of NaY used will depend upon operating conditions, system economics and ASU production requirements.

Adsorbents stronger than NaY could be re-engineered, by methods known in the art, to have properties similar to those of NaY. Such methods may include, but are not limited to changing the $SiO_2/Al_2O_3$ ratio, zeolite crystal content, binder content and residual $H_2O$ content. For example, 13X and 5A could be modified in the manner described above to yield an adsorbent having reduced nitrogen co-adsorption and sufficient capacity for the more strongly held adsorbates (e.g., $C_2H_2,CO_2$). It should be noted that the prepurifier embodiments of the invention are not limited to the adsorbents mentioned nor are they limited to the use of just two adsorbents.

The design of efficient adsorber beds for pressure swing adsorption cycles and the operation of these cycles is effected by means well-known in the art. For example, the invention may be practiced using two or more beds which operate out of phase with each other.

Mixtures of two or more adsorbents are potentially applicable to any fluid separation. Recovery of either the heavy or the light component as product from a fluid mixture has been demonstrated using air separation ($O_2$ product), $CO_2$ recovery from flue gas and prepurification as examples. Co-products processes, whereby both heavy and light components are recovered as products, may also utilize adsorbent mixtures.

Although the present invention is directed at specific gas separations, a methodology has been presented for selecting and evaluating adsorbent mixtures for any separation of interest. Other applicable separations include, but are not limited to, $O_2/Ar$, $H_2O/CO_2/N_2$ or air, $CO_2/H_2/CH_4/CO/N_2$ and drying of any fluid stream.

While the examples disclosed above describe the use of two adsorbents mixed together in a main adsorbent zone to separate a binary mixture of gases, the invention may be applied to mixing two or more adsorbents in one or more main adsorbent zones and the separation of one or more components from fluid mixtures containing more than two components. The fluid to be separated may be either a gas or a liquid. Layers and multiple layers of adsorbent mixtures, configured in both the equilibrium and mass transfer zones of an adsorber, are also contemplated by combining the methodology of the present invention with the concepts of commonly assigned, copending application Ser. No. 08/837,411.

While it is intended to mix adsorbents with similar physical characteristics, e.g. particle size, density, etc., it is not necessary to be bound by such limitations. Mixing adsorbents of similar physical characteristics insures pressure drop per unit bed length and bed void fractions similar to those of the individual adsorbents. Conversely, there may be situations where different physical characteristics of the adsorbent components in the mixture can be applied to improve overall process performance, e.g. using different particle sizes to enhance the overall rates of adsorption.

All of the concepts of the above disclosed embodiments apply generally to a full range of process conditions, e.g. temperature, pressure, pressure ratio, feed velocity, etc. It is only necessary to evaluate the characteristics of the adsorbent mixtures/composite at the process conditions of interest in order to select the mixture/composite providing maximum process performance. Likewise, these concepts can be applied to single-bed as well as multi-bed processes operating with subatmospheric (VSA), transatmospheric (VPSA) or superatmospheric (PSA) cycles. The adsorbent mixture/composite concepts described here are not limited to any particular adsorber configuration or flow arrangement. For example, the inventions can be effectively applied to axial flow, radial flow or lateral flow adsorbers, or the like. The adsorbent(s) may be constrained or unconstrained within the adsorber vessel.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for the separation of a heavy component from a light component in a feed stream, said process comprising passing said feed stream over an adsorbent bed comprising either a mixture of two or more adsorbents or composite adsorbent particles, each particle comprising two or more adsorbents, and wherein at least one of said adsorbents is comparatively weak and the other is comparatively strong with respect to the heavy component, and wherein said heavy component is adsorbed onto said comparatively strong and said comparatively weak adsorbents.

2. The process of claim 1, wherein said heavy component is nitrogen.

3. The process of claim 1, wherein said feed stream is air.

4. The process of claim 1, wherein said comparatively strong adsorbent is a LiX adsorbent and said comparatively weak adsorbent is NaX.

5. The process of claim 1, wherein said adsorbent bed is comprised of said mixture.

6. The process of claim 1, wherein said adsorbent bed is comprised of said composite adsorbent particles.

7. The process of claim 1, wherein said heavy component is $CO_2$ and said light component is $N_2$.

8. The process of claim 7, wherein said comparatively strong adsorbent is either NaX or NaY and said comparatively weak adsorbent is $Al_2O_3$.

9. A process for purifying a gas stream, said process comprising passing said gas stream through a pressure swing adsorption vessel containing a bed of adsorbent material capable of selectively adsorbing contaminants present in said feed gas stream at a high adsorption pressure and desorbing said contaminants at a low desorption pressure, the adsorption vessel containing a bed of adsorbent material capable of selectively adsorbing said contaminants present in said feed gas stream at the high adsorption pressure and desorbing said contaminants at the low desorption pressure, the adsorption vessel having a feed end for the introduction of said feed gas stream thereto and a product end for the recovery of purified feed gas therefrom, wherein said bed of adsorbent material comprises either a mixture of at least two adsorbents or composite adsorbent particles, each particle comprising at least two adsorbents, wherein at least one of said adsorbents is comparatively strong and at least another of said adsorbents is comparatively weak with respect to the adsorption of said contaminants, wherein said comparatively strong adsorbent preferentially adsorbs at least one of acetylene or C3–C8 hydrocarbons over $CO_2$, and wherein said comparatively strong adsorbent is self-cleaning with respect to said acetylene or C3–C8 hydrocarbons at a lesser purge than would be required for 13X.

10. A pressure swing adsorption apparatus for the separation of a heavy component from a light component in a feed stream, wherein said apparatus includes an adsorbent bed comprising either a mixture of two or more adsorbents or composite adsorbent particles, each of said particles comprising two or more adsorbents, and wherein at least one of said adsorbents is comparatively weak and the other is comparatively strong with respect to the heavy component.

11. The pressure swing adsorption apparatus of claim 10, wherein said heavy component is nitrogen.

12. The pressure swing adsorption apparatus of claim 10, wherein said feed stream is air.

13. The pressure swing adsorption apparatus of claim 10, wherein said comparatively strong adsorbent is a LiX adsorbent and said comparatively weak adsorbent is NaX.

14. The pressure swing adsorption apparatus of claim 10, wherein the ratio of said comparatively strong adsorbent to said comparatively weak adsorbent is dependent upon the temperature of the adsorbent bed.

15. The pressure swing adsorption apparatus of claim 10, wherein the ratio of said comparatively strong adsorbent to said comparatively weak adsorbent is between 0.1 and 0.9.

16. The pressure swing adsorption apparatus of claim 10, wherein said adsorbent bed comprises an equilibrium zone and a mass transfer zone.

17. The pressure swing adsorption apparatus of claim 16, wherein said mixture or composite adsorbent particles are only in said equilibrium zone.

18. The pressure swing adsorption apparatus of claim 17, wherein said mass transfer zone comprises said comparatively strong adsorbent.

19. The pressure swing adsorption apparatus of claim 10, wherein said adsorbent bed is comprised of said mixture.

20. The pressure swing adsorption apparatus of claim 10, wherein said adsorbent bed is comprised of said composite adsorbent particles.

21. The pressure swing adsorption apparatus of claim 10, wherein said heavy component is $CO_2$ and said light component is $N_2$.

22. pressure swing adsorption apparatus of claim 21, wherein said comparatively strong adsorbent is either NaX or NaY and said comparatively weak adsorbent is $Al_2O_3$.

23. A pressure swing adsorption gas purifier for the adsorption of contaminants present in a feed gas stream at a high adsorption pressure and for the desorption of said contaminants at a low desorption pressure, said purifier comprising:

an adsorption vessel containing a bed of adsorbent material capable of selectively adsorbing said contaminants present in said feed gas stream at the high adsorption pressure and desorbing said contaminants at the low desorption pressure, the adsorption vessel having a feed end for the introduction of said feed gas stream thereto and a product end for the recovery of purified feed gas therefrom, wherein said bed of adsorbent material comprises either a mixture of at least two adsorbents or composite adsorbent particles, each particle comprising at least two adsorbents, wherein at least one of said adsorbents is comparatively strong and at least another of said adsorbents is comparatively weak with respect to the adsorption of said contaminants, and wherein said comparatively strong adsorbent preferentially adsorbs at least one of acetylene or $C_3$–$C_8$, hydrocarbons over $CO_2$, and wherein said comparatively strong adsorbent is self-cleaning with respect to said acetylene or $C_3$–$C_8$ hydrocarbons at a lesser purge than would be required for 13X adsorbent.

24. The purifier of claim 23, wherein said comparatively strong adsorbent is NaY.

25. The purifier of claim 23, wherein said comparatively weak adsorbent is activated alumina.

26. The purifier of claim 23, wherein said comparatively weak adsorbent is activated alumina and said comparatively strong adsorbent is NaY, and wherein the ratio of NaY to activated alumina is between 5%/95% and 95%/5%.

27. The purifier of claim 23, wherein said comparatively-weak adsorbent is activated alumina and said comparatively strong adsorbent is NaY, and wherein the ratio of NaY to activated alumina is between 10%/90% and 60%/40%.

28. The purifier of claim 23, wherein said comparatively weak adsorbent is activated alumina and said comparatively strong adsorbent is NaY, and wherein the ratio of NaY to activated alumina is between 13%/87% and 25%/75%.

29. The purifier of claim 23, wherein said feed gas is air.

30. The purifier of claim 23, wherein said contaminants are at least one of water, acetylene, $CO_2$ and $C_3$–$C_8$ hydrocarbons.

31. The purifier of claim 23, further comprising a layer of said comparatively weak adsorbent between said feed end of said bed and either said mixture or said composite adsorbent particles.

* * * * *